(12) United States Patent
Ishikawa et al.

(10) Patent No.: US 12,122,427 B2
(45) Date of Patent: Oct. 22, 2024

(54) PEDESTRIAN PROTECTION SYSTEM

(71) Applicant: TOYOTA JIDOSHA KABUSHIKI KAISHA, Toyota (JP)

(72) Inventors: Marie Ishikawa, Nagoya (JP); Aya Hamajima, Nagoya (JP); Daichi Hotta, Tokyo (JP); Hayato Ito, Susono (JP); Hidekazu Sasaki, Yokohama (JP); Yasuhiro Kobatake, Nagoya (JP); Akihiro Kusumoto, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 17/944,655

(22) Filed: Sep. 14, 2022

(65) Prior Publication Data
US 2023/0137845 A1 May 4, 2023

(30) Foreign Application Priority Data

Nov. 2, 2021 (JP) ................. 2021-179535

(51) Int. Cl.
*B60W 60/00* (2020.01)
(52) U.S. Cl.
CPC ... *B60W 60/0017* (2020.02); *B60W 2540/041* (2020.02); *B60W 2554/4029* (2020.02); *B60W 2556/45* (2020.02)
(58) Field of Classification Search
CPC ....... B60W 60/0017; B60W 2540/041; B60W 2554/4029; B60W 2556/45; G08G 1/096816; G08G 1/202
See application file for complete search history.

(56) References Cited

U.S. PATENT DOCUMENTS

| 10,152,053 | B1* | 12/2018 | Smith | G01C 21/3438 |
| 11,928,967 | B2* | 3/2024 | Kim | H04W 4/44 |
| 2015/0329043 | A1* | 11/2015 | Skvarce | B60W 30/085 |
| | | | | 340/435 |
| 2017/0192437 | A1* | 7/2017 | Bier | G05D 1/0278 |

(Continued)

FOREIGN PATENT DOCUMENTS

| JP | 2007172116 A | * | 7/2007 |
| JP | 2007280257 A | * | 10/2007 |

(Continued)

*Primary Examiner* — Peter D Nolan
*Assistant Examiner* — Peter Y Ning
(74) *Attorney, Agent, or Firm* — Dinsmore & Shohl LLP

(57) ABSTRACT

A pedestrian protection system includes a plurality of autonomous driving vehicles and a server configured to be able to communicate with each of the autonomous driving vehicles. The server is configured to select at least one vehicle to be moved to the location of a pedestrian from among the autonomous driving vehicles as a pedestrian protection vehicle when a particular situation occurrence notification is received and is configured to send an instruction notification to the pedestrian protection vehicle. The particular situation occurrence notification indicates that the pedestrian is placed in a particular situation. The instruction notification instructs the pedestrian protection vehicle to move to the location of the pedestrian for protecting the pedestrian. Each of the autonomous driving vehicles is configured to move to the location of the pedestrian for protecting the pedestrian when the instruction notification is received.

9 Claims, 3 Drawing Sheets

(56) References Cited

U.S. PATENT DOCUMENTS

| | | | | |
|---|---|---|---|---|
| 2018/0018869 A1* | 1/2018 | Ahmad | .................. | G08G 1/054 |
| 2019/0197859 A1* | 6/2019 | Kanehara | ................ | G06V 20/10 |
| 2020/0142404 A1* | 5/2020 | Stroila | ............. | G08G 1/096725 |
| 2021/0144152 A1* | 5/2021 | Gogna | ................. | G05D 1/0022 |
| 2023/0124536 A1* | 4/2023 | Chien | .................. | G08G 1/0112 |
| | | | | 455/404.2 |
| 2024/0087450 A1* | 3/2024 | Donderici | ............ | G08G 1/0129 |

FOREIGN PATENT DOCUMENTS

| | | | | |
|---|---|---|---|---|
| JP | 2016192028 A | * | 11/2016 | |
| JP | 2019-117449 A | | 7/2019 | |
| WO | WO-2022202192 A1 | * | 9/2022 | ............. G08B 25/00 |

* cited by examiner

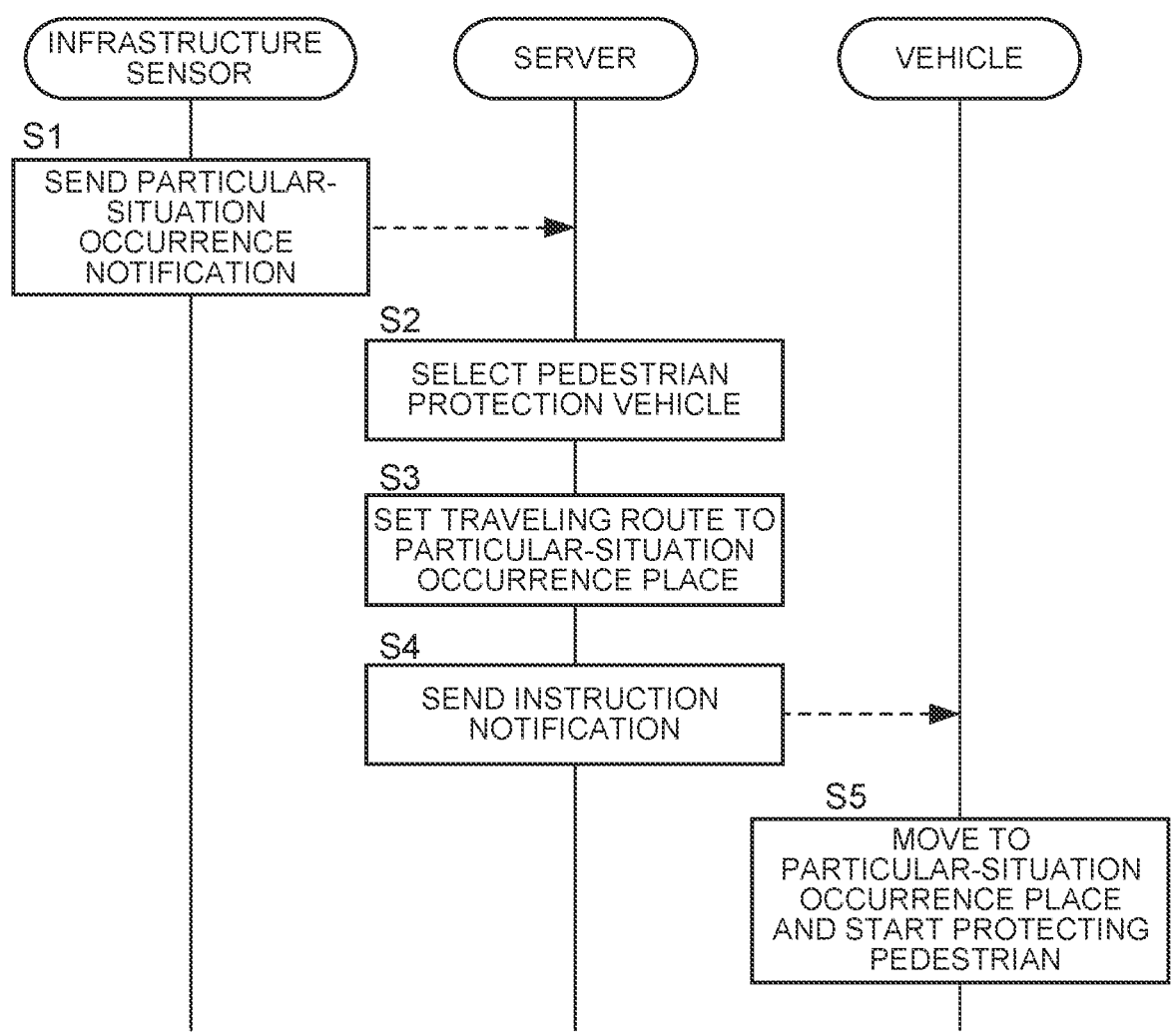

PEDESTRIAN PROTECTION SYSTEM

CROSS-REFERENCE TO RELATED APPLICATION

This application claims priority to Japanese Patent Application No. 2021-179535 filed on Nov. 2, 2021, incorporated herein by reference in its entirety.

BACKGROUND

1. Technical Field

The present disclosure relates to a pedestrian protection system.

2. Description of Related Art

Japanese Unexamined Patent Application Publication No. 2016-192028 (JP 2016-192028 A) discloses an autonomous driving vehicle that autonomously travels along a route to the destination.

SUMMARY

Today, attempts are being made to provide various mobility services such as transportation, distribution of goods, and product sales using autonomous driving vehicles. As a part of mobility services, providing services that help improve the safety of residents and the security of the city is useful for the society.

In view of such problems, it is an object of the present disclosure to provide mobility services that are useful for improving the safety of residents and the security of the city.

To solve the problem described above, a first aspect of the present disclosure relates to a pedestrian protection system including a plurality of autonomous driving vehicles and a server configured to be able to communicate with each of the autonomous driving vehicles. The server is configured to select at least one vehicle to be moved to the location of a pedestrian from among the autonomous driving vehicles as a pedestrian protection vehicle when a particular situation occurrence notification is received and is configured to send an instruction notification to the pedestrian protection vehicle. The particular situation occurrence notification indicates that the pedestrian is placed in a particular situation. The instruction notification instructs the pedestrian protection vehicle to move to the location of the pedestrian for protecting the pedestrian. Each of the autonomous driving vehicles is configured to move to the location of the pedestrian for protecting the pedestrian when the instruction notification is received.

A second aspect of the present disclosure relates to a server including a communication unit, configured to communicate with a plurality of autonomous driving vehicles, and a control unit. The control unit is configured to select at least one vehicle to be moved to the location of a pedestrian from among the autonomous driving vehicles as a pedestrian protection vehicle when a particular situation occurrence notification is received and is configured to send an instruction notification to the pedestrian protection vehicle. The particular situation occurrence notification indicates that the pedestrian is placed in a particular situation. The instruction notification instructs the pedestrian protection vehicle to move to the location of the pedestrian for protecting the pedestrian.

A third aspect of the present disclosure relates to an autonomous driving vehicle including a communication device configured to communicate with a server. The autonomous driving vehicle is configured to move to the location of a pedestrian placed in a particular situation for protecting the pedestrian, based on an instruction from the server.

In these aspects of the present disclosure, the pedestrian protection system moves a vehicle to a pedestrian placed in a particular situation for protecting the pedestrian, thus providing mobility services for improving the safety of residents and the security of the city.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a sequence diagram showing an example of pedestrian protection processing according to one embodiment of the present disclosure for protecting pedestrians.

DETAILED DESCRIPTION OF EMBODIMENTS

Figure 1:
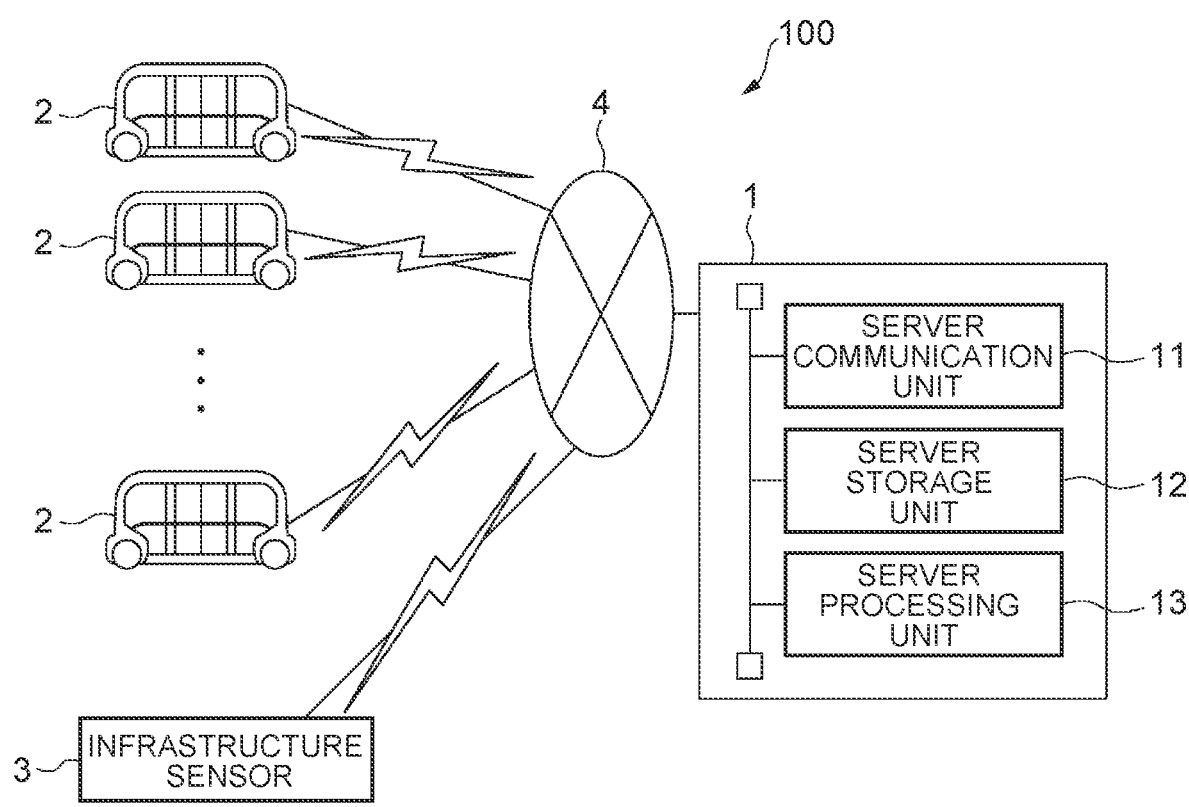
FIG. 1 is a diagram showing an outline of a pedestrian protection system according to one embodiment of the present disclosure.

An embodiment of the present disclosure will be described in detail below with reference to the drawings. In the description below, the same reference numerals will be given to the same or similar components.

FIG. 1 is a schematic configuration diagram showing a pedestrian protection system 100 according to one embodiment of the present disclosure.

The pedestrian protection system 100 according to this embodiment includes a server 1, a plurality of vehicles 2, and an infrastructure sensor 3.

The infrastructure sensor 3 is installed in various places on the roads in an area, such as a smart city, managed by the server 1. The infrastructure sensor 3 detects the surrounding situation of a location where the infrastructure sensor 3 is installed (hereinafter, this surrounding situation is referred to as "sensor surrounding situation") and, at the same time, detects whether the sensor surrounding situation is a particular situation. In this embodiment, the infrastructure sensor 3 is configured to include a camera and, based on an image taken by the camera, is configured to detect a sensor surrounding situation for detecting whether the sensor surrounding situation is a particular situation.

In this embodiment, a "particular situation" refers to a situation in which it is desirable to ensure the safety of a pedestrian on a road. Such situations include a situation in which children, women, and the elderly are more likely to be involved in crime or danger; for example, a situation in which children, women and the elderly is walking on a low-traffic road or a night road or a situation in which children are going to school in groups. In addition to the situations given above, there is a particular situation in which a demonstration march is taking place since a trouble may occur between a group of pedestrians performing the demonstration march and pedestrians around the demonstration march who are not related to the demonstration.

In this embodiment, the infrastructure sensor 3 is configured to be able to access a radio base station (not shown), connected to the network 4 via the gateway, etc. so that, when the sensor surrounding situation is a particular situation, the infrastructure sensor 3 can send a notification about the occurrence of the particular situation (hereinafter this notification is referred to "particular-situation occurrence notification") to the server 1 via the radio base station and the network 4. The particular-situation occurrence notification includes the information such as the content of the particular situation, the occurrence place, and the occurrence time (hereinafter this information is referred to as "particular situation information").

The vehicle 2 is an autonomous driving vehicle that performs operation under management of the server 1. This vehicle is used to provide various mobility services such as transportation, distribution of goods, and product sales. In this embodiment, the pedestrian protection system 100 is configured using vehicles (for example, autonomous driving buses and autonomous driving taxis) that provide the mobility service described above and that, when a ride request is received from a ride requester via an application, etc., provide the transportation service of stopping at a predetermined location or a place specified by the ride requester for picking up the ride requester.

Figure 2:
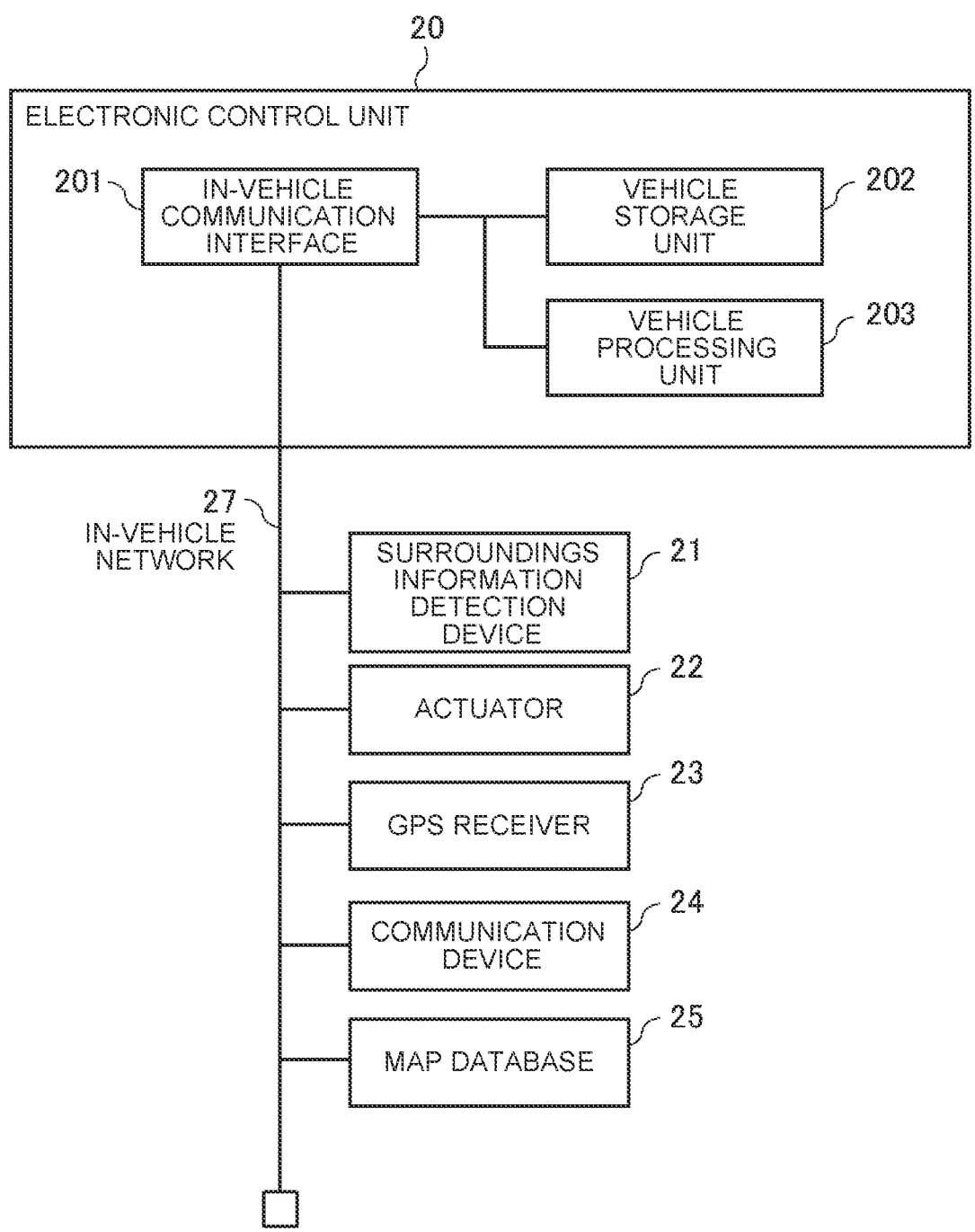
FIG. 2 is a diagram showing a hardware configuration of a vehicle.

FIG. 2 is a diagram showing a hardware configuration of the vehicle 2.

As shown in FIG. 2, the vehicle 2 includes a surroundings information detection device 21, an actuator 22, a GPS receiver 23, a communication device 24, a map database 25, and an electronic control unit 20. Using these components, the vehicle 2 is configured to perform acceleration, steering, and braking automatically. The surroundings information detection device 21, actuator 22, GPS receiver 23, communication device 24, and map database 25 are communicably connected to the electronic control unit 20 via an in-vehicle network 27 that conforms to standards such as Controller Area Network (CAN).

The surroundings information detection device 21 detects surrounding information on the vehicle 2. The surroundings information includes various types of information necessary for autonomous driving such as the information on white lines on roads, other vehicles, pedestrians, bicycles, buildings, signs, traffic lights, and obstacles. Examples of the surroundings information detection device 21 include a camera, a millimeter wave radar, a lidar (LiDAR; light detection and ranging), and an ultrasonic sensor. The surroundings information detection device 21 may be configured by any one of these devices or by a combination these devices. The output of the surroundings information detection device 21 is sent to the electronic control unit 20.

The actuator 22 includes various types of control parts driven by the electronic control unit 20 for performing autonomous driving. Examples of actuators include a drive device (for example, at least one of an internal combustion engine and a motor) required for accelerating the vehicle 2, a braking device (for example, a brake actuator) required for braking the vehicle 2, and a steering device (for example, a steering motor) required for steering the vehicle 2.

The GPS receiver 23 receives radio waves from artificial satellites and identifies the latitude and longitude of the vehicle 2 for detecting the current position of the vehicle 2.

The communication device 24 is an in-vehicle terminal having the wireless communication function. The communication device 24 accesses a radio base station, connected to the network 4 (see FIG. 1) via the gateway, for connection to the network 4 via the radio base station. This allows mutual communication with the server 1.

The map database 25 stores map information. The electronic control unit 20 acquires map information from the map database 25.

The electronic control unit 20 includes an in-vehicle communication interface 201, a vehicle storage unit 202, and a vehicle processing unit 203. The in-vehicle communication interface 201, the vehicle storage unit 202, and the vehicle processing unit 203 are connected to each other via a signal line.

The in-vehicle communication interface 201 is a communication interface circuit for connecting the electronic control unit 20 to the in-vehicle network 27.

The vehicle storage unit 202 has a storage medium such as a hard disk drive (HDD), an optical recording medium, and a semiconductor memory. The vehicle storage unit 202 stores various computer programs and data used for processing in the vehicle processing unit 203.

The vehicle processing unit 203 has one or more central processing units (CPUs) and peripheral circuits thereof. The vehicle processing unit 203 executes various computer programs stored in the vehicle storage unit 202 to perform various types of processing. For example, the vehicle processing unit 203 is a processor. The vehicle processing unit 203 (therefore, the electronic control unit 20 as a whole) controls the actuator 22 for performing autonomous driving, for example, based on the output of the surroundings information detection device 21 or based on instructions from the server 1 received via the communication device 24.

Returning to FIG. 1, the server 1 includes a server communication unit 11, a server storage unit 12, and a server processing unit 13.

The server communication unit 11, which includes a communication interface circuit for connecting the server 1 to the network 4 via, for example, the gateway, is configured to allow the server 1 to communicate with the infrastructure sensor 3 and the vehicle 2.

The server storage unit 12, which includes a storage medium such as a hard disk drive (HDD), an optical recording medium, and a semiconductor memory, stores various computer programs and data used for processing in the server processing unit 13. For example, in this embodiment, the server storage unit 12 stores the identification number of, and the operation information (operation route and operation time) on, each of the vehicles 2 that provide the transportation service as well as the map information.

The server processing unit 13 has one or more central processing units (CPUs) and peripheral circuits thereof. The server processing unit 13 executes various computer programs stored in the server storage unit 12 to comprehensively control the overall operation of the server 1. For example, the server processing unit 13 is a processor.

As described above, providing services that help improve the safety of residents and the security of the city as a part of mobility services is very useful for the society and, in addition, important for creating a new city such as a smart city.

To achieve this object, the following processing is performed in this embodiment. That is, when the occurrence of a particular situation is detected by the infrastructure sensor 3, the vehicle 2, selected from the vehicles 2 as a suitable vehicle, is moved to the particular-situation occurrence place so that the vehicle 2, moved to the particular-situation occurrence place, can protect a pedestrian placed in the particular situation. With reference to FIG. 3, an example of pedestrian protection processing for protecting a pedestrian placed in a particular situation will be described.

FIG. 3 is a sequence diagram showing an example of pedestrian protection processing performed in this embodiment. In the sequence diagram shown in FIG. 3, the communication between the infrastructure sensor 3 and the server 1 and the communication between the server 1 and the vehicle 2 are performed via the network 4, respectively.

In step S1, upon detecting that the sensor surrounding situation is a particular situation, the infrastructure sensor 3 sends a particular-situation occurrence notification to the server 1.

In step S2, when the particular-situation occurrence notification is received, the server 1 selects, from among the vehicles 2 that provide the transportation service, at least one vehicle 2 available for protecting a pedestrian placed in the particular situation (hereinafter this vehicle is referred to as "pedestrian protection vehicle"). In this embodiment, from among the vehicles 2 that provide the transportation service, the server 1 extracts vehicles 2 with no ride request from ride requesters. Then, from the extracted vehicles 2 with no ride request, the server 1 selects the vehicle 2 nearest to the particular-situation occurrence place as the pedestrian protection vehicle.

In step S3, the server 1 sets a traveling route for moving the pedestrian protection vehicle to the particular-situation occurrence place. In this embodiment, the server 1 sets the shortest route to the particular-situation occurrence place as the traveling route.

In step S4, the server 1 sends an instruction notification instructing the pedestrian protection vehicle to go to the particular-situation occurrence place. The instruction notification includes the traveling route to the particular-situation occurrence place.

In step S5, the vehicle 2 that has received the instruction notification moves to the particular-situation occurrence place and starts protecting the pedestrian placed in the particular situation.

In this embodiment, to protect a pedestrian placed in a particular situation, the vehicle 2 starts traveling side by side with the pedestrian. Causing the vehicle 2 to travel side by side in this way makes it less likely for a criminal to attack the pedestrian even if he or she is walking on a low-traffic road, because there is a risk of being photographed, for example, when a camera is mounted on the vehicle 2. That is, causing the vehicle 2 to travel side by side allows the vehicle 2 to act as a deterrent to crime, thus reducing the probability that the pedestrian will be involved in crime. In addition, causing the vehicle 2 to travel side by side allows the vehicle 2 to act as a shield that will protect the pedestrian, for example, when a runaway vehicle approaches the pedestrian.

Before starting side-by-side traveling for protecting a pedestrian, the vehicle 2 may notify the pedestrian of the start of side-by-side traveling, for example, by voice or may ask the pedestrian for permission to travel side by side. In addition, at night, the vehicle 2 may illuminate the front of the pedestrian with a light when traveling side by side. In addition, when the pedestrian can be identified by performing short-range communication with a pedestrian's mobile terminal while traveling side by side, the vehicle 2 may send the information indicating that the pedestrian is being protected and, if necessary, may send the image of the pedestrian, taken by the in-vehicle camera, to the contact address that is set for each pedestrian in advance.

In this embodiment, one of the vehicles 2 that provides the transportation service and has no ride request from ride requesters is sent to the location of a pedestrian as the pedestrian protection vehicle. Therefore, for example, when the number of pedestrians is equal to or less than the passenger capacity of the pedestrian protection vehicle, an offer to ride in the vehicle may be made to the pedestrians before starting side-by-side traveling.

The pedestrian protection system 100 according to this embodiment described above includes a plurality of the vehicles 2 (autonomous driving vehicles) and the server 1 configured to be able to communicate with each of the vehicles 2. The server 1 is configured to select, from among the vehicles 2, at least one vehicle to be moved to the location of a pedestrian as a pedestrian protection vehicle when a particular-situation occurrence notification, which notifies that a pedestrian is placed in a particular situation, is received. The server 1 is also configured to send an instruction notification, which instructs the pedestrian protection vehicle to move to the location of the pedestrian for protecting the pedestrian, to the selected pedestrian protection vehicle. The vehicles 2 are each configured to move to the location of the pedestrian for protecting the pedestrian when the instruction notification is received.

This embodiment described above causes the vehicle 2 to move to the location of a pedestrian placed in a particular situation for protecting the pedestrian using the vehicle 2, making it possible to provide mobility services that help improve the safety of residents and improve the security of the city.

In particular, each of the vehicles 2 is configured to travel side by side with a pedestrian for protecting the pedestrian when the instruction notification is received.

The configuration described above provides the following advantages. In a particular situation in which the likelihood that a pedestrian will be involved in crime or danger is high, for example, in a situation in which children, women, or the elderly are walking on a low-traffic road or a night road or in a situation in which children are going to school in groups, side-by-side traveling makes it less likely for a criminal to attack the pedestrian, because there is a risk of being photographed, for example, when a camera is mounted on the vehicle 2. That is, causing the vehicle 2 to travel side by side allows the vehicle 2 to act as a deterrent to crime, thus reducing the probability that the pedestrian will be involved in crime. Therefore, it is possible to improve the safety of residents and the security of the city.

In addition, causing the vehicle 2 to travel side by side allows the vehicle 2 to act as a shield that will protect the pedestrian, for example, when a runaway vehicle approaches the pedestrian. Therefore, it is possible to improve the safety of residents.

In addition, in a particular situation in which a trouble may occur between a specific pedestrian group and the surrounding pedestrians who are not related to the specific pedestrian group, for example, in a situation in which there is a pedestrian group performing a specific action such as a demonstration march, causing the vehicle 2 to travel side by side with the specific pedestrian group can keep a distance between the specific pedestrian group and the surrounding pedestrians, lowering the probability of a trouble. Therefore, it is possible to improve the safety of residents and the security of a city.

In this embodiment, the vehicle 2 is a transportation service vehicle in which a ride requester can ride, and the server 1 is configured to select a pedestrian protection vehicle from among the vehicles 2 each with no ride requester. Therefore, in this embodiment, it is possible to effectively utilize the vehicle 2 that is not currently able to provide the transportation service.

In this embodiment, the vehicle 2 may be configured to make an offer to pedestrians to ride in the vehicle when the vehicle 2 moves to the location of the pedestrians upon receiving an instruction notification and it is found that the number of pedestrians is equal to or less than the passenger capacity of the vehicle. The vehicle 2, when configured in this way, makes it possible not only to improve the safety of residents and the security of the city but also to improve convenience. In addition, when the vehicle 2 is a transportation service vehicle in which a ride requester can ride, it is possible to effectively utilize the vehicle 2 that is not currently able to provide the transportation service.

While an embodiment of the present disclosure has been described above, it is to be understood that the embodiment shows only a part of the application example of the present disclosure and that the technical scope of the present disclosure is not limited to the specific configuration of the embodiment described above. For example, though set by the server 1 in the above embodiment, the traveling route for moving a pedestrian protection vehicle to a partial-situation occurrence place may be set by the pedestrian protection vehicle.

What is claimed is:

1. A pedestrian protection system comprising:
    a plurality of autonomous driving vehicles; and
    a server configured to be able to communicate with each of the autonomous driving vehicles, wherein:
    the server is configured to select at least one vehicle to be moved to a location of a pedestrian from among the autonomous driving vehicles as a pedestrian protection vehicle when a particular situation occurrence notification is received and is configured to send an instruction notification to the pedestrian protection vehicle, the particular situation occurrence notification indicating that the pedestrian is placed in a particular situation, the instruction notification instructing the pedestrian protection vehicle to move to the location of the pedestrian for protecting the pedestrian;
    each of the autonomous driving vehicles is configured to move to the location of the pedestrian for protecting the pedestrian when the instruction notification is received;
    each of the autonomous driving vehicles is configured to notify the pedestrian of starting side by side travel and travel side by side with the pedestrian for protecting the pedestrian when the instruction notification is received.

2. The pedestrian protection system according to claim 1, wherein each of the autonomous driving vehicles is configured to make an offer to the pedestrian to ride in the vehicle when the vehicle moves to the location of the pedestrian upon receiving the instruction notification and it is found that the number of the pedestrians is equal to or less than a passenger capacity of the vehicle.

3. The pedestrian protection system according to claim 1, wherein:
    each of the autonomous driving vehicles is a transportation service vehicle in which a ride requester is to ride; and
    the server is configured to select the pedestrian protection vehicle from autonomous driving vehicles that are included in the autonomous driving vehicles and have no ride requester.

4. The pedestrian protection system according to claim 1, wherein the particular situation is a situation in which a probability that a pedestrian is involved in crime or danger is high.

5. The pedestrian protection system according to claim 1, wherein the particular situation is a situation in which there is a possibility of trouble between a group of pedestrians performing a specific action and surrounding pedestrians not related to the group of pedestrians.

6. The pedestrian protection system according to claim 1, wherein each of the autonomous driving vehicles is configured to illuminate a front of the pedestrian with light when traveling side by side at night.

7. The pedestrian protection system according to claim 1, wherein each of the autonomous driving vehicles is configured to:
    capture an image of the pedestrian taken by an on-board camera; and
    transmit the image to a contact address associated with the pedestrian.

8. A server configured:
    communicate with a plurality of autonomous driving vehicles; and
    select at least one vehicle to be moved to a location of a pedestrian from among the autonomous driving vehicles as a pedestrian protection vehicle when a particular situation occurrence notification is received and is configured to send an instruction notification to the pedestrian protection vehicle, the particular situation occurrence notification indicating that the pedestrian is placed in a particular situation, the instruction notification instructing the pedestrian protection vehicle to move to the location of the pedestrian for protecting the pedestrian, wherein
    the at least one vehicle is configured to notify the pedestrian of starting side by side travel and travel side by side with the pedestrian for protecting the pedestrian when the instruction notification is received.

9. An autonomous driving vehicle comprising a terminal configured to communicate with a server, wherein, based on an instruction from the server, the autonomous driving vehicle is configured to move to a location of a pedestrian placed in a particular situation for protecting the pedestrian, notify the pedestrian of starting side by side travel, and travel side by side with the pedestrian for protecting the pedestrian when the instruction notification is received.

* * * * *